United States Patent

Melanson et al.

Patent Number: 5,131,884
Date of Patent: Jul. 21, 1992

[54] CUTTING ASSEMBLY FOR SEPARATING LINKED MEAT PRODUCTS

[75] Inventors: Leslie B. Melanson, Belmar; Gerald C. Berendt, Seaside Park, both of N.J.

[73] Assignee: Bermel Industries, Inc., Seaside Park, N.J.

[21] Appl. No.: 676,284

[22] Filed: Mar. 28, 1991

[51] Int. Cl.⁵ .................... A22C 11/00; B26D 5/34
[52] U.S. Cl. ........................ 452/49; 452/29; 83/365
[58] Field of Search ............ 452/49, 46, 47, 48, 452/29; 83/365, 371

[56] References Cited

U.S. PATENT DOCUMENTS

| | | | |
|---|---|---|---|
| 3,659,316 | 5/1972 | Berendt et al. | 452/49 |
| 3,716,891 | 2/1973 | Demarest | 17/1 |
| 3,840,937 | 10/1974 | Berg | 17/1 |
| 4,044,425 | 8/1977 | Nausedas | 452/49 |
| 4,060,875 | 12/1977 | Gogling | 17/1 |
| 4,104,763 | 8/1978 | Tetsuro | 17/1 |
| 4,194,268 | 3/1980 | Deerwester | 452/49 |
| 4,214,492 | 7/1980 | Hoffman | 83/24 |
| 4,233,709 | 11/1980 | Smith | 17/1 |
| 4,322,871 | 4/1982 | Townsend | 17/1 |
| 4,366,600 | 1/1983 | Townsend | 17/52 |
| 4,373,231 | 2/1983 | Maso | 17/1 |
| 4,463,477 | 8/1984 | Ziolko | 17/34 |
| 4,563,792 | 1/1986 | Niedecker | 452/46 |
| 4,584,740 | 4/1986 | Townsend | 17/1 |
| 4,766,173 | 8/1988 | Evans | 452/48 |
| 4,852,214 | 8/1989 | Melanson et al. | 452/49 |

Primary Examiner—Willis Little
Attorney, Agent, or Firm—Clifford G. Frayne

[57] ABSTRACT

A cutting assembly for severing a chain of linked articles joined together by joining segments, the linked articles and joining segments being comprised of a semi-rigid casing, for example, collagen, the cutting assembly having a pair of knives positioned perpendicular to the path of movement of the linked articles, the distance between the knives adjustable to accommodate joining segments of differing lengths, the knives being activated upon registration of the joining segments between the knives to sever the joining segments from adjacent linked articles.

9 Claims, 7 Drawing Sheets

CUTTING ASSEMBLY FOR SEPARATING LINKED MEAT PRODUCTS

FIELD OF INVENTION

The present invention is directed towards a cutting mechanism for separating linked meat products and, in particular, a cutting mechanism for separating linked meat products in which the casing of the meat product is semi-rigid such as a collagen casing.

BACKGROUND OF THE INVENTION

Frankfurters, sausages and other like articles are manufactured by forcing a homogeneous fluid mass into an elongated casing. The length of the frankfurter or meat product is determined by twisting or tying off the casing periodically along its length creating individual frankfurters joined by intermediate joining segments.

Subsequently, the frankfurters, sausages or the like are severed in order to provide for individual frankfurters, sausages or the like for packaging.

The problems associated with severing the link or chain of frankfurters has been addressed and a number of solutions involving separate structures and functions have devised. A representative sample of these solutions would include the following: U.S. Pat. No. 4,214,492; U.S. Pat. No. 3,716,892; U.S. Pat. No. 4,463,477; U.S. Pat. No. 4,373,231; U.S. Pat. No. 4,104,763; U.S. Pat. No. 4,584,740; U.S. Pat. No. 3,840,937; U.S. Pat. No. 4,060,875; U.S. Pat. No. 4,366,600; U.S. Pat. No. 4,322,871; U.S. Pat. No. 4,233,709 and U.S. Pat. No. 3,659,316.

The latter patent, U.S. Pat. No. 3,659,316 was developed by the Applicants herein. All of the aforementioned patents were directed to methods and apparatus for separating linked meat products. In each instance, the linked meat product was enclosed in a casing which could be characterized as being soft, flexible and easily severed. As such, a rotating single blade knife could be utilized as disclosed in U.S. Pat. No. 3,646,637 to separate the linked material.

Therefore, the joining segment remaining at each end of the frankfurter after it had been severed posed no problem to the packaging of the frankfurter, sausage or the like.

New products on the market, such as linked beef sticks and some types of sausage, are manufactured in the same manner as frankfurters, however, the casing is comprised of a collagen material which is more rigid and inflexible than the normal casing associated with the hotdog. Problems have been encountered in the packaging of this collagen encased meat product in that a single cut of adjoining segments results in a rigid, tapered and somewhat pointed end. This is caused by the fact that collagen encased meat products have to be twisted more turns so that the links will not unravel while being transported to the smoke or hanging sticks or rods; thus resulting in a much longer twisted space between the links. This rigid, tapered, pointed end causes problems in the packaging of the material in that it punctures the cellophane or plastic wrapping especially when the wrapping is applied in a shrink wrap manner, such as vacuuming.

Therefore, while cutting mechanisms described in the aforesaid patents might be capable of separating linked meat materials encased in a collagen casing, the separated links present packaging problems which result in wasted material and a product which is not sealed against contamination.

The Applicants herein have developed a cutting mechanism adaptable to their link separator as disclosed in U.S. Pat. No. 3,659,316 which addresses and solves the problem of separating collagen encased meat products which eliminates the tapered, pointed ends of the product such that the product can be wrapped for sale without incurring the problem of the product puncturing the wrapping.

OBJECTS OF THE INVENTION

An object of the present invention is to provide for a novel and useful cutting assembly for separating linked products such as frankfurters, sausage and the like which are formed with a semi-rigid, collagen casing.

It is a further object of the present invention to provide for a novel and useful cutting assembly for separating linked products such as frankfurters, sausage and the like which are packaged in a semi-rigid, collagen casing, the separation of which results in blunt ends on the frankfurter and the like.

A still further object of the present invention is to provide for a novel and useful cutting mechanism which is adjustable in order to accommodate different length joining segments between the linked product.

A still further object of the present invention is to provide for a novel and useful cutting assembly which can accommodate a high volume of feed rate of linked material.

SUMMARY OF THE INVENTION

A cutting assembly for cooperation with a linked separator for severing a chain of linked articles joined together by joining segments, the linked articles and the joining segments being comprised of a semi-rigid casing, for example, collagen, the cutting assembly comprising a pair of knives positioned perpendicular to the path of movement of the linked articles and joining segments. The distance between each pair of knives adjustable to accommodate joining segments of different length, each pair of knives comprising an upper blade and a lower blade, the upper blade and lower blade of each pair of knives being activated by a cam assembly activated when the joining segment is positioned between the pair of knives, the opposing blades of each pair of knives operating in a scissor-cut fashion to simultaneously cut the joining segment proximate to the ends of the linked material, said knives operating substantially simultaneously in severing said joining segment from said linked material.

BRIEF DESCRIPTION OF THE DRAWINGS

These and other objects of the present invention would be manifest and achieved by the cutting assembly disclosed herein, a preferred embodiment of which is illustrated in the following drawings wherein.

DETAILED DESCRIPTION OF THE DRAWINGS

Figure 1:
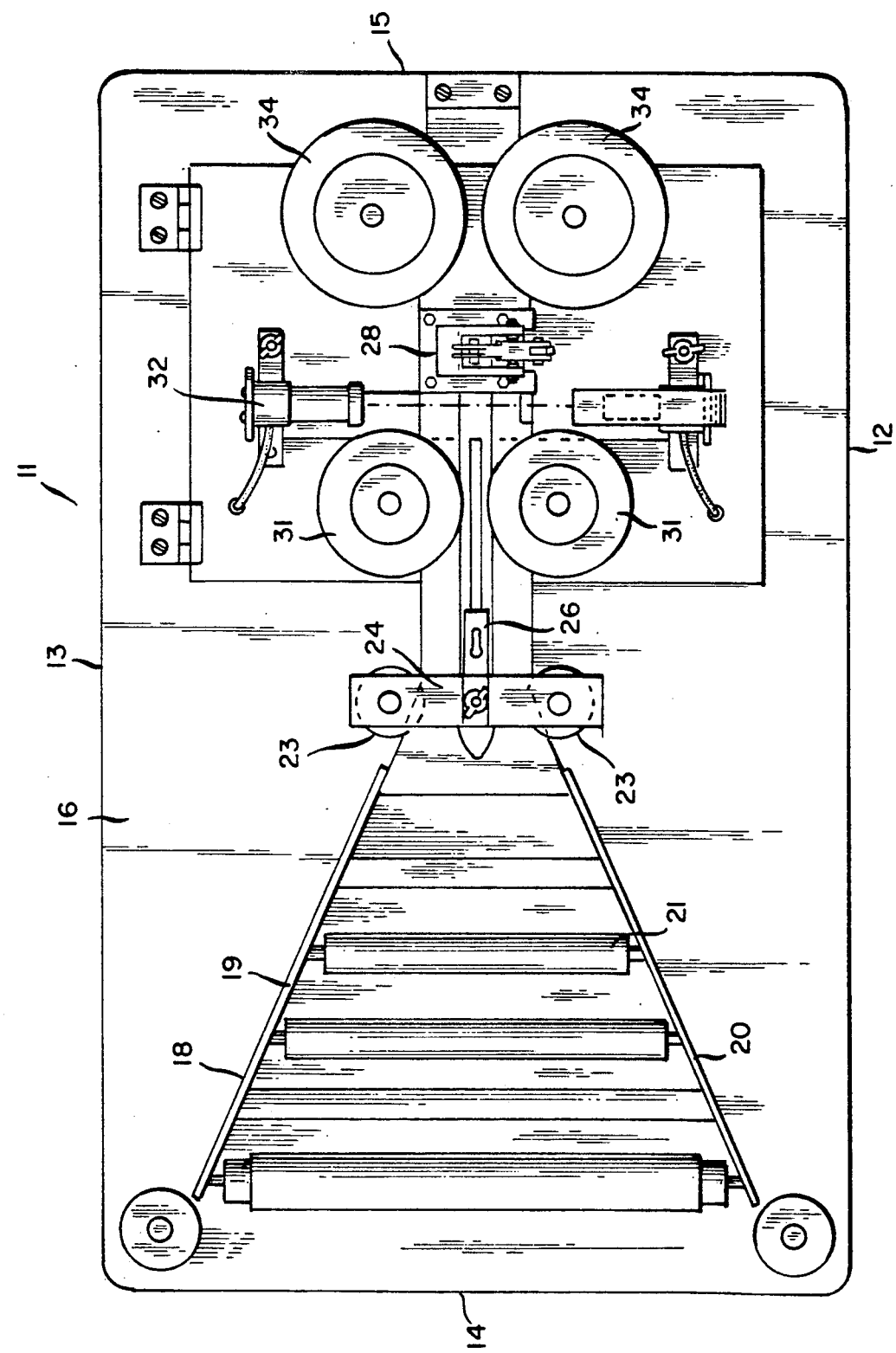
FIG. 1 is a top planer view of a link separating device.
Figure 2:
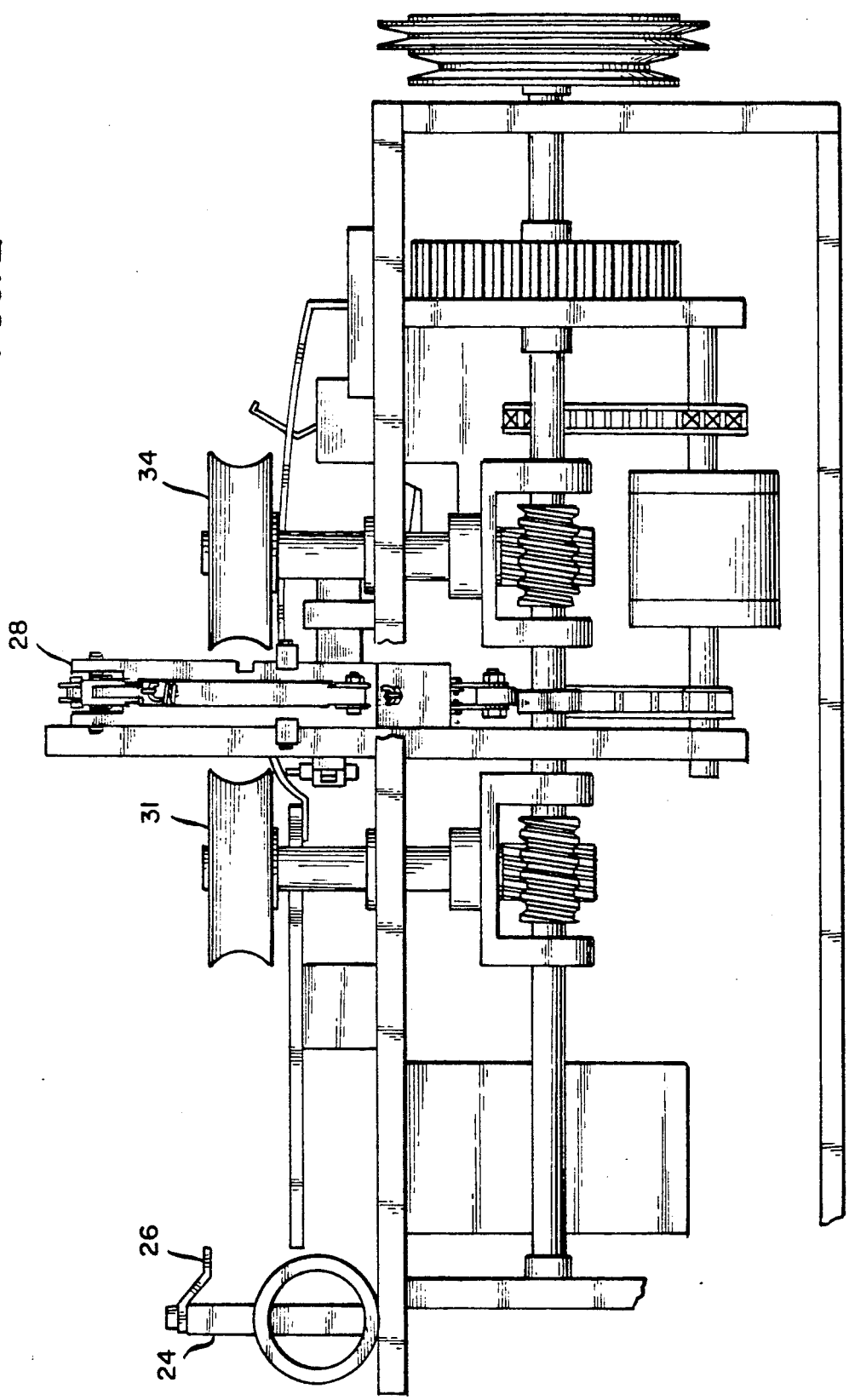
FIG. 2 is a partial side elevational cutaway view of a link separating device.

Referring to the detailed illustrations in FIGS. 1 and 2, there is illustrated a link separator substantially identical as that disclosed in Applicant's prior patent, U.S. Pat. No. 3,659,316. The link separator comprises a hollow housing 11 defined by front and rear walls 12 and 13, respectively and end walls 14 and 15, respectively. The top platform 16 has a guide mechanism 18 mounted thereon comprising of a pair of upstanding flanges 19 and 20 which converge in the direction of movement of the linked material, there being disposed between upstanding flanges 19 and 20, a plurality of horizontal guide rollers 21 to aid in the movement of the linked material.

Proximate to the converging terminus of upstanding flanges 19 and 20 there is positioned a pair of horizontal guide rollers 23 to aid in directing the linked material toward the severing station. Guide rollers 23 have positioned between them, an elevated platform 24 which supports a spring guide 26 to hold the linked material in a horizontal flat position. Guide rollers 23 direct the linked material to a severing station 28 which is perpendicular to the path of the linked material.

As disclosed in U.S. Pat. No. 3,659,316, this severing station when utilized for hot dogs or sausages or the like in which the casing is soft, flexible or pliable, comprises a rotary, single blade knife which would sever the joining segments of the links. This knife would rotate in a 360° arc and would be synchronized as discussed in the aforesaid patent with respect to the positioning of the joining segments of the linked material.

In operation, the linked material would be fed to the severing station from the left as shown in FIG. 1 by means of feed rollers 31. A photocell mechanism 32 located proximate to the severing station activates the severing means. A second pair of feed rollers 34 positioned on the opposing side of the severing station served to transport the linked material away from the severing station. Outgoing feed rollers 34 rotate faster than incoming feed rollers 31. This is to facilitate the stretch of the product at the joining segment so as to have an appropriate gap for severing. In the foregoing embodiment for the severing of frankfurters, sausages and the like, which are packaged in a flexible casing, the mechanism was synchronized through the use of a series of gears and chain drives with the severing knife being chain driven. The present embodiment for severing linked material in semirigid non-flexible casings utilizes a photocell and a series of gears and cams to synchronize the severing of the linked product as illustrated in FIG. 2 and will be described hereafter, but rather than using a rotating knife, the present embodiment utilizes a pair of vertically reciprocating scissor-like knife blades which can best be understood with reference to FIGS. 3 through 7.

Figure 3:
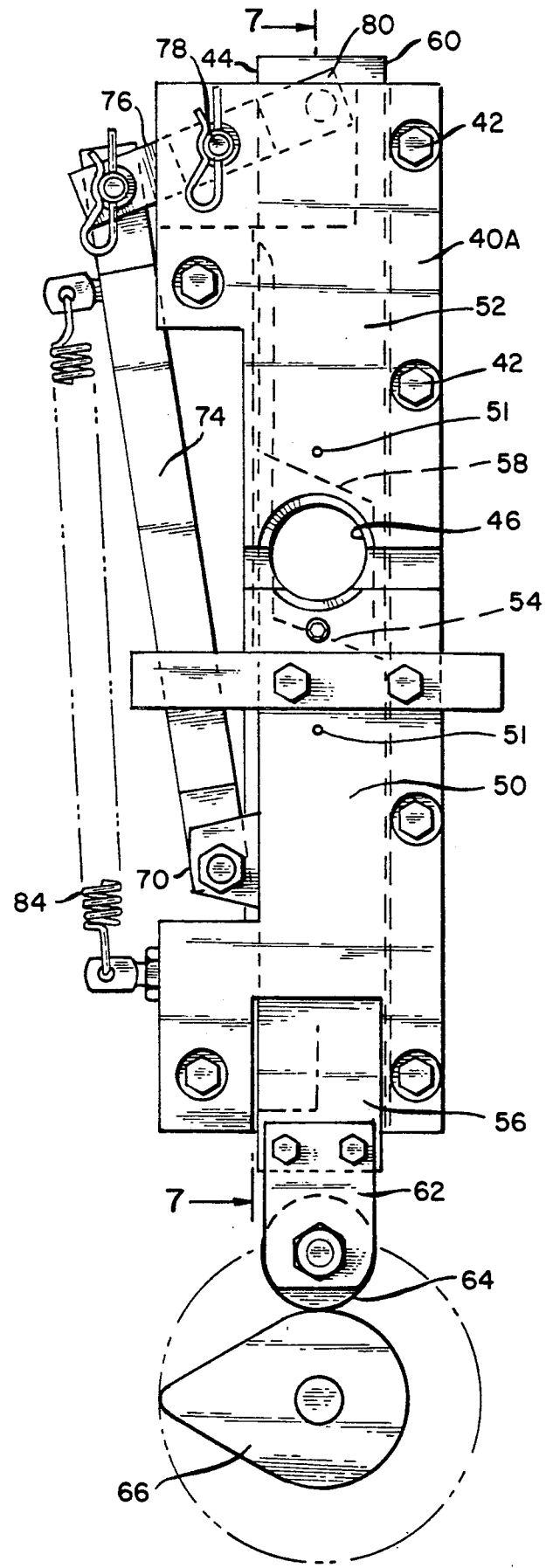
FIG. 3 is an front elevational view of the cutting assembly.
Figure 4:
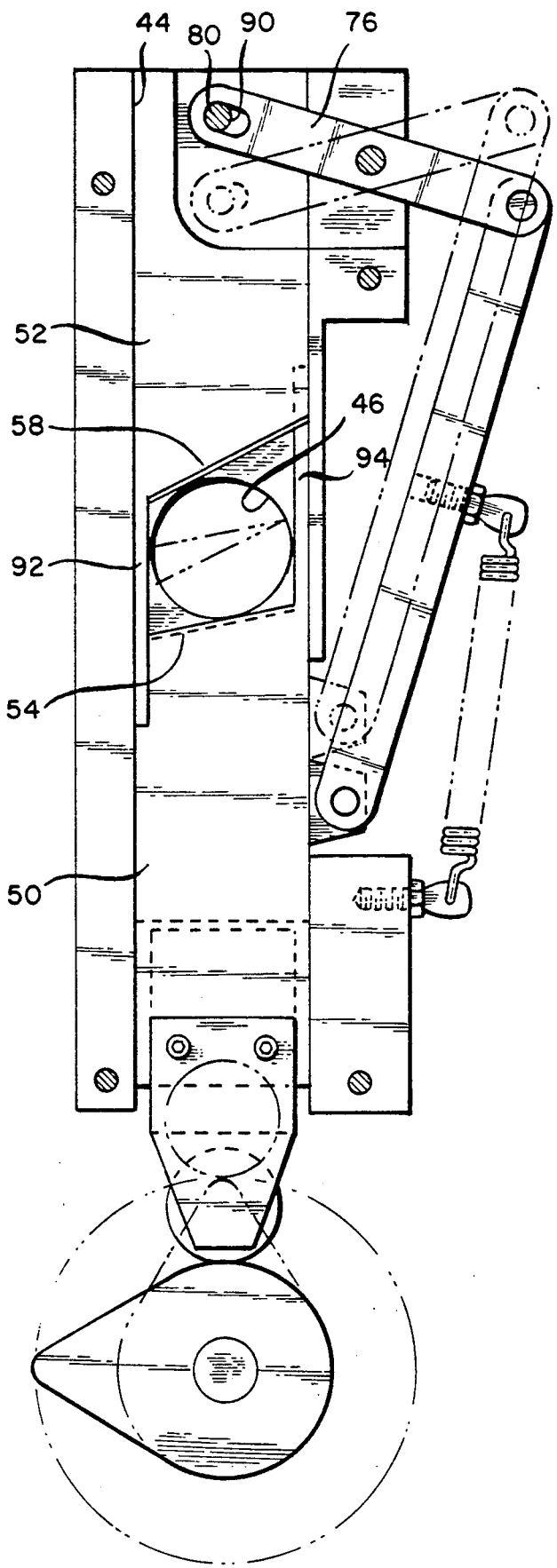
FIG. 4 is a rear, elevational, partial cutaway view of the cutting mechanism.
Figure 7:
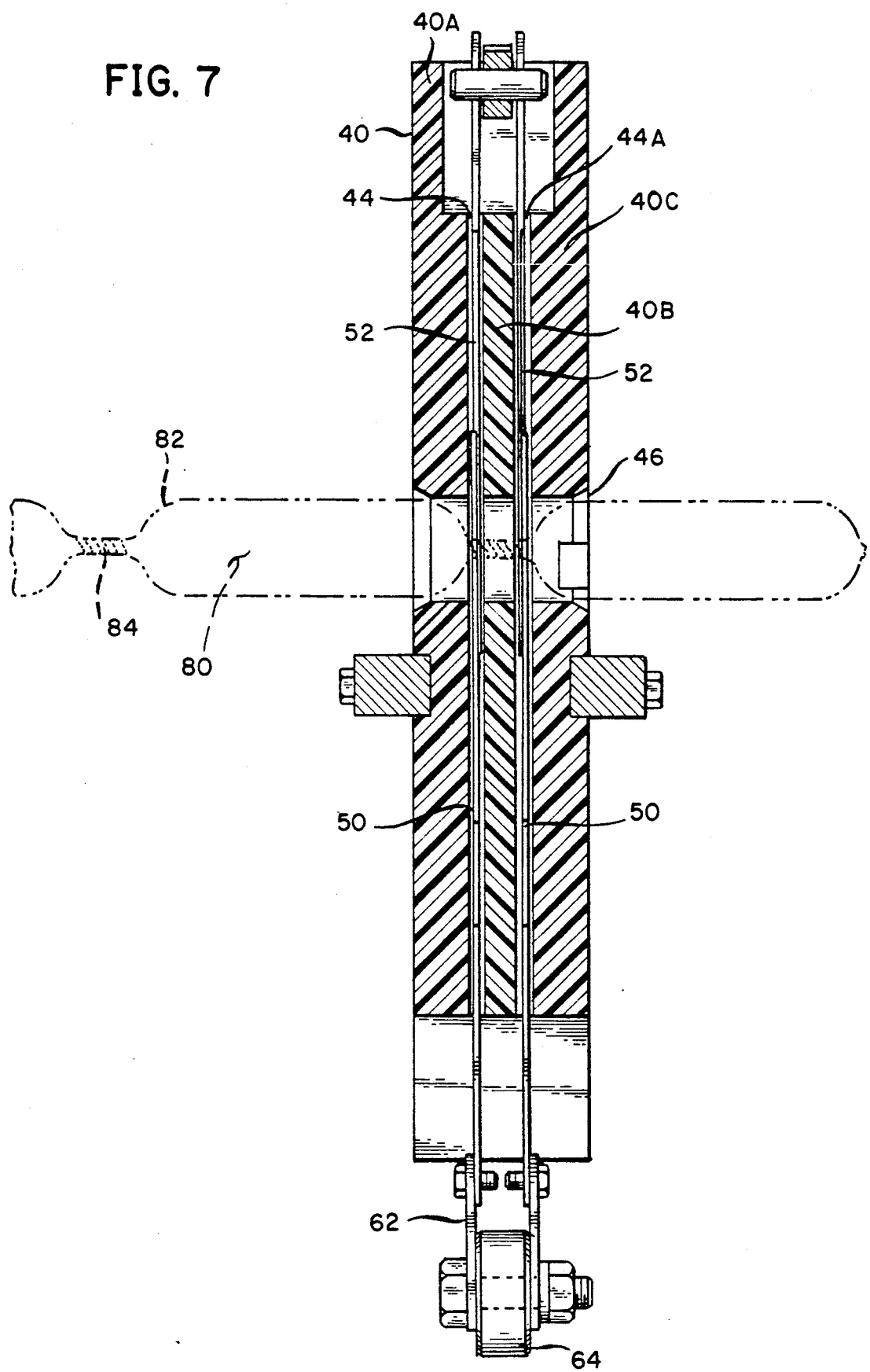
FIG. 7 is a side elevational cuttaway view of the cutting mechanism along plane 7—7 of FIG. 3.

For clarity, reference is first made to FIG. 7 which is a side, elevational, cutaway view of the severing mechanism along plane 7—7 of FIG. 3. The severing mechanism comprises a housing 40 composed of recomplimentary, longitudinal sections 40A, 40B, and 40C which when joined together, by a plurality of securing means 42, define housing 40 having two vertical longitudinal channels 44 and 44A passing therethrough, channels 44 and 44A being substantially rectangular in cross sectional area. Longitudinal sections 40A, 40B and 40C, when secured together, define an aperture 46 which passes horizontally through housing 40 and intersects channels 44 and 44A FIG. 3 illustrates a front elevational view of the severing mechanism and FIG. 4 represents a rear, elevational partial cutaway view of the severing mechanism. FIGS. 3 and 4 will be discussed with respect to the operation of the cutting mechanism within channel 44 of housing 40, it being recognized that the identical cutting operation takes place simultaneously utilizing identical cutting mechanisms in channel 44A.

Reciprocally disposed within channel 44 are lower knife blade 50 and upper knife blade 52. Lower knife blade 50 has an angled cutting end 54 and a blunt end 56. Upper cutting blade 52 has an angled cutting edge 58 and a blunt end 60. Blunt end 56 of lower knife blade 50 has secured thereto a fork member 62 having rotatably positioned thereon a roller 64 for contact with a cam lobe 66.

Positioned on one edge of lower knife blade 50 is an extending shoulder 70 which extends outwardly from housing 40 through slit 72 formed between complimentary halves 40A and 40B of housing 40. A first lever arm 74 is secured to extending finger 70 and is attached to second lever arm 76 which in turn is rotatably secured to housing 40 at pivot point 78 with its opposing end 80 being secured to blunt end 60 of upper knife blade 52. A bias means in the form of a spring 84 is secured to housing 40 and first lever arm 74.

In this configuration, cam lobe 66 rotating in a 360° arc activates lower knife blade 50 by means of roller 64, and fork member 62 secured to blunt end 56 of lower knife blade 50. Lower knife blade 50 commences upward movement within channel 44 of housing 40. This upward motion of lower knife blade 50 is transmitted to upper knife blade 52 by means of first lever arm 74 and second lever arm 76 which, due to their configuration and mounting, causes the simultaneous downward motion of upper knife blade 52 of the respective vertical motions of lower knife blade 50 and upper knife blade 52 terminating with their overlapping scissor-like inner section proximate to the axis of aperture 46. The continued rotation of cam lobe 66 in conjunction with the spring tension of biasing means 84 returns the knife blades to their respective positions and allows the linked material to pass through aperture 46.

FIG. 4 illustrates with greater clarity the structural configuration of knife blades 50 and 52 within housing 40. FIG. 4 is a rear, partial cutaway view of the cutting assembly. In this illustration, channel 44 which provides the pathway for upper knife 52 and lower knife 50 is easily discernible. Upper knife blade 52 has an aperture or connecting means 90 for permitting upper knife blade 52 to be secured to lever arm 76 at 80. Angled cutting edge 58 of upper knife blade 52 has a downwardly extending guide finger 92. Lower knife blade 50 has a similar identical upstanding guide finger 94 on its angled cutting edge 54. When complimentary half 40A and 40B of housing 40 are secured with the knife blades contained therein, guide fingers 92 and 94 overlap the opposing knife to provide for a cutting motion in which the angled cutting edges 58 and 54 respectively do not contact each other, but rather overlap each other in passing through aperture 46 so as to present a scissor-like cut to the joining segment of the linked material.

The knives 52 and 50 are of such a length and positioned within channel 44 such that in the retracted mode, the blades are proximate to, but do not encroach upon the circumference of aperture 46. Ball plungers 51 apply pressure to the blades as they approach each other so there is no possibility of the blades separating apart horizontally. The size of cam lobe 66 in conjunction with fork arm 62 and roller 64 thus provides sufficient upward movement that lower knife blade 50 and upper knife blade 52 overlap for a sufficient distance when activated so as to provide for the scissor-cut proximate to the central axis of aperture 46.

Figure 5:
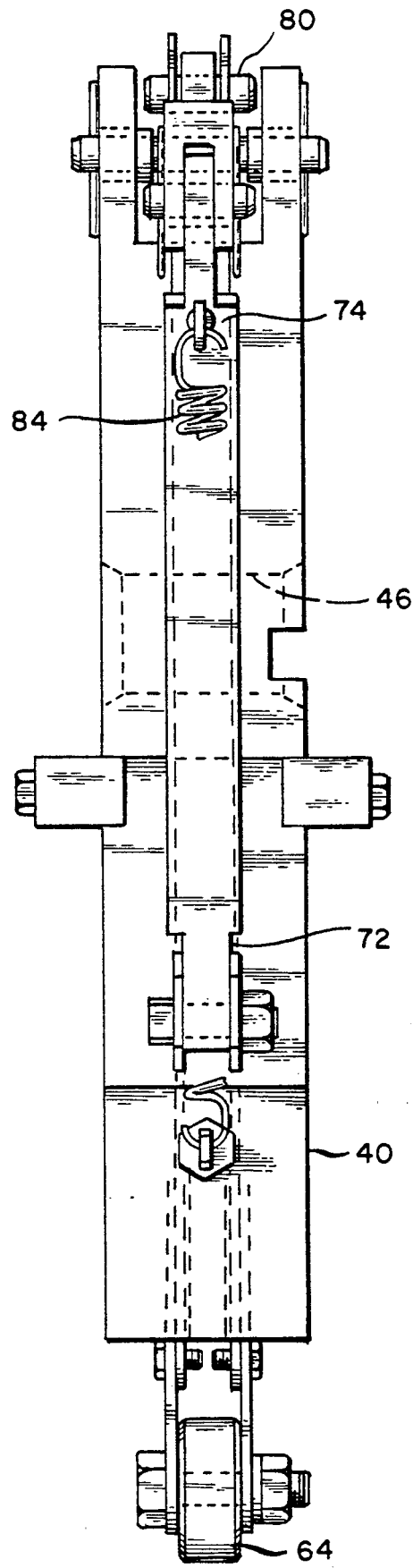
FIG. 5 is a side elevational view of the cutting assembly.

FIGS. 3 and 4 illustrate the embodiment of applicant's cutting assembly for severing linked material which is encased in a semi-rigid casing such as collagen. This knife blade assembly would sever linked material including that packed in collagen, but would leave a pointed or tapered end on the link capable of puncturing the wrapping material. Therefore, two cutting mechanisms are required which would simultaneously cut the joining segment of the linked material proximate to the ends of the adjoining linked material, hence, the identical cutting assembly positioned in channel 44A as illustrated in FIG. 7. FIG. 5 is a side elevational view of the double knife mechanism.

Figure 6:
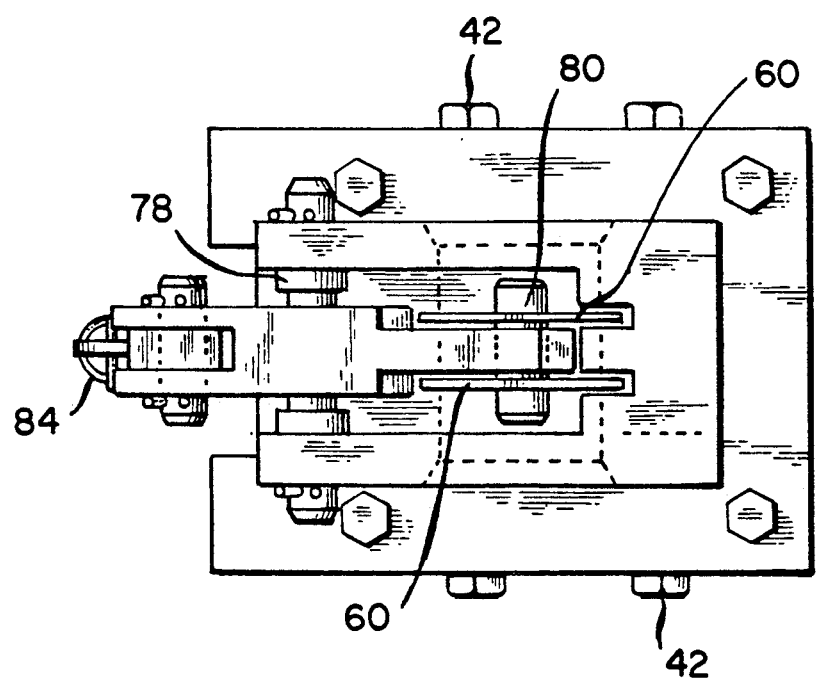
FIG. 6 is a top elevational view of the cutting mechanism.

Both knives operate on the same principle as previously discussed and the distance between the knives is governed by the thickness of complimentary section 40B of housing 40 which determines the distance between channels 44 and 44A. Both knives could be activated and operate simultaneously off of a single cam lobe 66 and single lever spring mechanism 74, 76 and 84 as illustrated in FIGS. 5 and 6 or the second knife could operate off a separate cam mechanism and lever arm mechanism, but be synchronized with the first cam lobe so that both knives operated simultaneously.

FIG. 7 is a side elevational cutaway view of the double knife configuration illustrating the positioning of the linked material in alignment with aperture 46 and the respective cutting mechanisms.

The meat product 80 is produced and encased in a collagen casing 82. The product is produced in link form with the collagen casing 82 subjected to being twisted, thus producing the joining segments 84 between the links. As a result of the collagen casing 82 being semi-rigid, the joining segments 84 are semi-rigid such that if severed by a single knife blade, would result in a pointed end on each link. It is this pointed end that presents problems in packaging, especially shrink wrapping where the semi-rigid pointed ends would puncture the shrink wrapping. This problem is obviated by Applicant's severing mechanism as illustrated in FIG. 7 wherein the severing mechanism cuts the joining segment 84 in two locations, simultaneously, proximate to the ends of the linked product. The distance between the pair of cutting blades in Applicant's severing mechanism is governed by the thickness of complimentary section 40B. Thus, the cutting mechanism can be modified to accommodate linked material in collagen casings wherein the joining segment 84 varies in length.

In operation, the linked product is fed by means of guide rollers 21 and 23 to severing station 28. Severing station 28 is activated by means of photocell 32 through a series of gears and cams as shown in FIG. 2 and explained in U.S. Pat. No. 3,659,316 to activate knife blades 50 and 52 in paired combination to sever the joining segment of the linked product. Guide rollers 34 serve to remove the severed linked product while guide rollers 31 serve to position the next sequential linked product in position for severing the joining segment.

It will be recognized by those skilled in the art that while the cutting mechanism disclosed by Applicant is specifically designed for meat products encased in a collagen casing, the severing mechanism may have application to linked products produced and encased in a softer or more resilient casing.

While the above matter describes and illustrates the preferred embodiment of the invention, it should be understood that the invention is not restricted solely to the described embodiments, but covers all modifications which should be apparent to one skilled in the art which would fall within the scope and spirit of the invention.

We claim:

1. A severing assembly for a link separator for separating linked meat products encased in a semi-rigid casing, the separator comprising a means for drive feeding to said severing assembly, a chain of articles comprising linked meat products joined together by joining segments, a photocell and opposed light source proximate to said severing assembly, said severing assembly generally perpendicular to and extending through said joining segments, a drive means for said severing assembly, a control means for said drive means activated in response to a signal from said photocell, said control means activating said severing assembly for each joining segment, a means for drive discharging severed articles from the severing assembly, said severing assembly comprising:

a housing positioned proximate to said photocell and opposed light source, said housing having a horizontal passageway therethrough in alignment with the path of said chain of articles having said joining segments;

two longitudinal channels positioned in said housing perpendicular to said horizontal passageway, said longitudinal channel separated within said housing a distance approximately equal to the length of said joining segment of said chain of articles;

opposing knife means positioned in each of said longitudinal channels of said housing, said knife means slidable within said longitudinal channels in response to said drive means, said drive means sequentially moving said knife blades in a reciprocating motion across said horizontal passageway, for contacting and severing said joining segments of said chain of articles, said knife means severing said joining segment at locations immediately adjacent said adjacent chain of articles.

2. An assembly in accordance with claim 1 wherein said horizontal passageway in said housing is of a cross sectional area approximately equal to the cross sectional area of said chain of articles.

3. An assembly in accordance with claim 1 wherein said opposing knives in said longitudinal channels of said housing comprise an upper knife and a lower knife slidably movable within said longitudinal channels, said upper knife and said lower knife having a downwardly depending finger and an upwardly depending finger respectively permitting said knives to intersect in an overlap, scissor-like fashion when slidably moved towards each other to intersect at said horizontal passageway and cut said joining segments.

4. An assembly in accordance with claim 3 wherein said lower knife blades and said upper knife blades in said longitudinal channels of said housing are simultaneously slidable within said longitudinal channels, in a reciprocating manner responsive to said drive means, said drive means further comprising a lever and biasing assembly, said lever assembly secured to said lower knife blade and said upper knife blade, said biasing assembly secured to said lever assembly and said housing.

5. An assembly in accordance with claim 1 wherein said drive means comprises a roller secured to said lower knife blade, said roller responsive to a rotating cam sequentially activated by said photocell and opposed light source indicating positioning of a joining segment between said longitudinal channels of said housing.

6. A severing assembly for separating linked meat products encased in a semi-rigid casing, the linked meat product comprising a chain of articles joined together by joining segments transported into registration with said severing assembly, the severing assembly comprising:
   a housing, said housing having a passageway therethrough for the passage of said chain of articles and said joining segments;
   two longitudinal channels positioned in said housing perpendicular to said horizontal passageway, said longitudinal channels separated within said housing a distance approximately equal to the length of said joining segments of said chain of articles;
   opposing knife means positioned in each of said longitudinal channels of said housing, said knife means slidable within said longitudinal channels in response to a drive means, said drive means sequentially moving said knife blades in a reciprocating motion across said horizontal passageway, for contacting and severing said joining segments of said chain of articles when said joining segments are in registration within said horizontal passageway, said knife means severing said joining segments at locations immediately adjacent said adjacent chain of articles.

7. An assembly in accordance with claim 6 wherein said horizontal passageway of said housing is of a cross sectional area approximately equal to the cross sectional area of said chain of articles.

8. An assembly in accordance with claim 6 wherein said opposing knives and said longitudinal channels of said housing comprise an upper knife and a lower knife slidably movable within said longitudinal channels, said upper knife and said lower knife having a downwardly depending finger and an upwardly depending finger respectively permitting said knives to intersect in an overlap, scissor-like fashion when slidably moved towards each other to intersect at said horizontal passageway and cut said joining segments.

9. An assembly in accordance with claim 6 wherein said lower knife blades and said upper knife blades in said longitudinal channels of said housing are simultaneously slidable within said longitudinal channels, in a reciprocating manner responsive to said drive means, said drive means comprising a lever and biasing assembly, said lever assembly secured to said lower knife blade and said upper knife blade and said biasing assembly secured to said lever assembly and said housing.

* * * * *